Patented Mar. 20, 1928.

1,663,251

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PURIFICATION OF 3:4-DICHLOROANILINE.

No Drawing. Application filed August 19, 1926. Serial No. 130,348.

This invention relates to the purification of 3:4-dichloroaniline (1 amino 3:4 dichlorobenzol, hereinafter referred to as 3:4 dichloroaniline).

In the preparation of 3:4-dichloroaniline, there has been no method described in the literature, to the best of our knowledge, which gives directly the pure isomer 3:4-dichloroaniline in an economic way.

We have discovered a method of purification of the crude amine which eliminates the other isomeric amines present in a satisfactory measure. We have found that the sulfate of 3:4-dichloroaniline is practically insoluble in cold water, whereas the sulfates of the other amines present in the crude amine are sufficiently soluble to effect a separation. This method of purification may be carried out in various ways, as will be understood by those familiar with the art. For example, the crude amine may be dissolved in concentrated sulfuric acid and this solution poured into a large quantity of water and cooled, the amines isomeric to the 3:4-dichloroaniline remaining in solution and the 3:4-dichloroaniline precipitating out as the sulfate; or the crude amine may be dissolved in dilute acid such as hydrochloric, acetic, and others, and the 3:4-dichloroaniline precipitated as its sulfate from this solution by the addition of a soluble metal sulfate or sulfuric acid.

Using the methods as outlined above, we have found it possible to obtain technically 3:4-dichloroaniline, after basing up the sulfate and drying, in such state of purity as to give the correct melting point for the chemically pure substance.

Without limiting our invention to any particular procedure, the following example, in which parts by weight are given, illustrates the application of our invention in the preferred form:

1000 parts of crude amine (crystallizing point (wet) 57°–60° C., (dry) 62°–65°) are added to 8500 parts of water. To this are added 920 parts of 20° Bé. hydrochloric acid. The amines are dissolved by heating to 80°–95° C. The clear solution is separated from any undissolved oil by either a filtration or decantation and filtration. To the clear solution at a temperature of about 80° C. are added under agitation over a period of ½ hour 400 parts of 77% sulfuric acid. There results at this temperature a partial precipitation of the 3:4-dichloroaniline sulfate, which is practically complete upon cooling the solution down to 20° C. The 3:4-dichloroaniline sulfate is then filtered off from the soluble amino salts and washed with about 2000 parts of cold water.

The yield varies according to the amount of impurities in the original crude amine but, on the basis of 1000 parts of technical 3:4-dichloroaniline, of the average purity heretofore available, the yield approximates 800 parts of 3:4-dichloroaniline (mol. wt. 162) in the form of its sulfate. To isolate the base, this sulfate is suspended in about 4000 parts of water and based with 425 parts by volume of caustic soda solution 40° Bé. The thus purified and isolated base will have a crystallizing point, wet—67° C. and dry—72° C.

We are aware that numerous details of the process may be varied through a wide range without departing from the principles of this invention, and we do not desire limiting the patent granted otherwise than as necessitated by the prior art.

We claim as our invention:

1. The method of separating 3:4-dichloroaniline from a mixture of dichloroanilines, which comprises forming the sulfates of the dichloroanilines in the presence of water and separating the practically insoluble sulfate of 3:4-dichloroaniline from the dissolved sulfates of the other dichloroanilines.

2. The method of separating 3:4-dichloroaniline from a mixture of dichloroanilines, which comprises treating said mixture with sulfuric acid to form the sulfates of the dichloroanilines and separating out the practically insoluble sulfate of 3:4-dichloroaniline from a water solution of the sulfates of the isomeric dichloroanilines.

3. The method of separating 3:4-dichloroaniline from a mixture of dichloroanilines, which comprises treating said mixture with an acid adapted to dissolve the mixture, converting the 3:4-dichloroaniline into its practically insoluble sulfate and separating said sulfate from the dissolved salts of the other dichloroanilines.

4. The method of separating 3:4-dichloroaniline from a mixture of dichloroanilines, which comprises dissolving said mixture of amines in a suitable dilute acid at an elevated temperature, adding sulfuric acid to form the practically insoluble sulfate of 3:4-dichloroaniline, cooling, and separating the precipitated sulfate of 3:4-dichloroaniline.

5. The method of separating 3:4-dichloroaniline from a mixture of dichloroanilines, which comprises dissolving said mixture of amines in a suitable dilute acid, adding sulfuric acid to form the practically insoluble sulfate of 3:4-dichloroaniline, and separating the sulfate of 3:4-dichloroaniline from the solution of the isomeric dichloroanilines.

6. The method of separating 3:4-dichloroaniline from its isomers, which comprises forming a water solution of the salts of said amines and precipitating out of solution the practically insoluble sulfate of 3:4-dichloroaniline.

7. The method of separating 3:4-dichloroaniline from its isomers, which comprises forming a water solution of the sulfates of said amines and cooling the solution to precipitate out the practically insoluble sulfate of 3:4-dichloroaniline.

8. The method of purifying 3:4-dichloroaniline containing its isomers, which comprises converting the 3:4-dichloroaniline into its practically insoluble sulfate in the presence of water and separating said sulfate of 3:4-dichloroaniline from a solution of the isomers.

In testimony whereof we have hereunto subscribed our names.

IVAN GUBELMANN.
HENRY J. WEILAND.
OTTO STALLMANN.